United States Patent [19]

Lorenz et al.

[11] 3,989,259

[45] Nov. 2, 1976

[54] LIP SEAL WITH IMPROVED BORE RETENTION AND INSTALLATION INCLUDING THE SEAL

[75] Inventors: John J. Lorenz, Chagrin Falls, Ohio; Jon A. Chandler, Farmington Hills, Mich.

[73] Assignee: Federal-Mogul Corporation, Southfield, Mich.

[22] Filed: Oct. 20, 1975

[21] Appl. No.: 624,113

Related U.S. Application Data

[63] Continuation-in-part of Ser. No. 506,057, Sept. 16, 1974, abandoned.

[52] U.S. Cl. ............................... 277/169; 277/179; 277/182
[51] Int. Cl.² .......................................... F16J 15/32
[58] Field of Search.... 277/169, 171, 179, 181–186, 277/189

[56] References Cited
UNITED STATES PATENTS

| | | |
|---|---|---|
| 2,755,113 | 7/1956 | Baumheckel .................... 277/179 |
| 3,560,002 | 2/1971 | Smedley ............................. 277/1 |
| 3,814,446 | 6/1974 | Derman ........................... 277/169 |

FOREIGN PATENTS OR APPLICATIONS

590,937   1/1960   Canada ............................. 277/179

*Primary Examiner*—Robert I. Smith
*Attorney, Agent, or Firm*—Owen, Wickersham & Erickson

[57] ABSTRACT

Improved bore retention of a lip seal is provided by case structure having a series of interrupted, short angularly outwardly deflected portions barely covered by an elastomeric covering. The angularly outwardly deflected portions and the elastomeric covering are proportioned carefully relatively to the bore, which is provided with an annular groove at one end that aids in retaining the seal, in cooperation with displaced elastomer and the outwardly deflected case portions.

11 Claims, 10 Drawing Figures

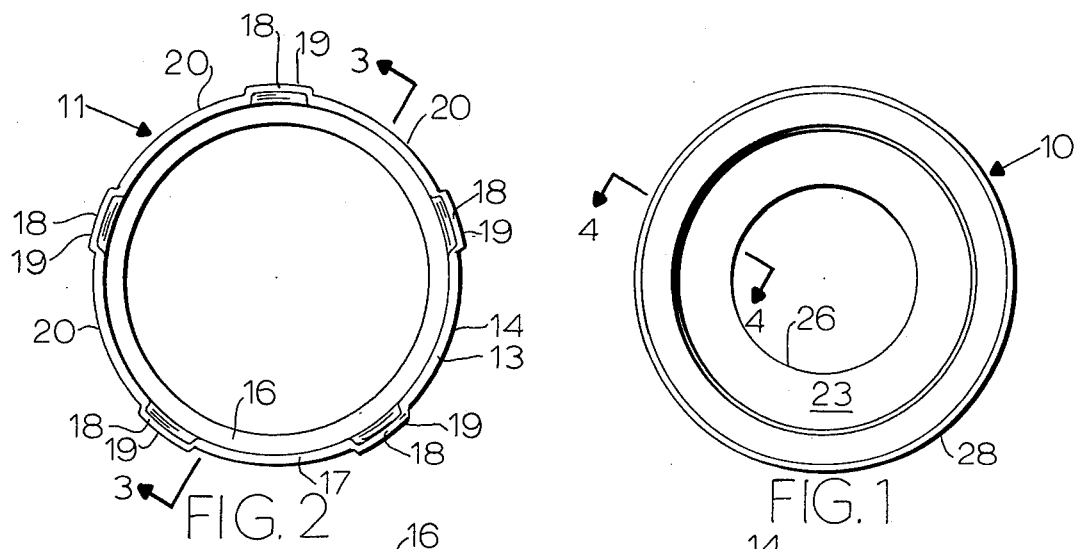
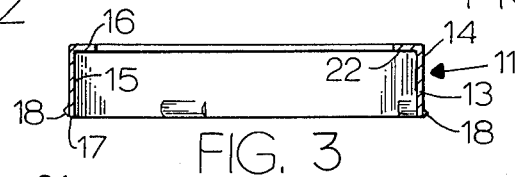
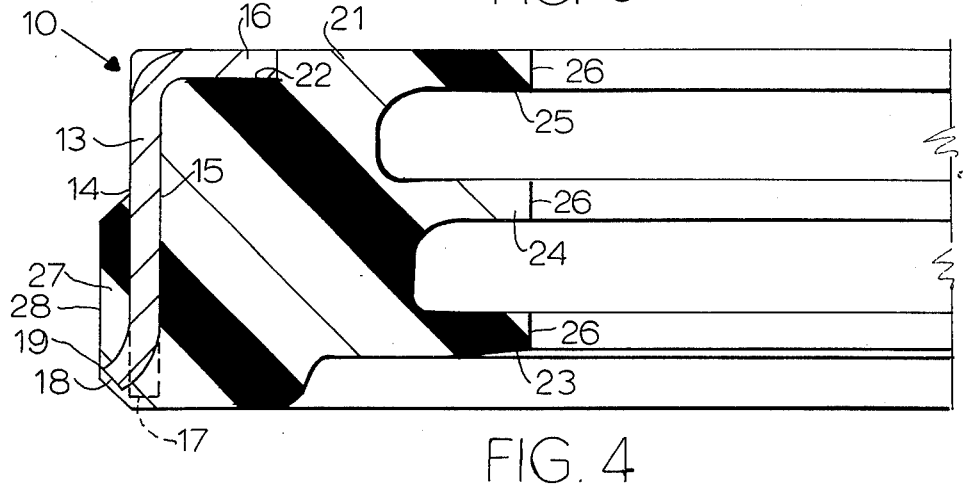
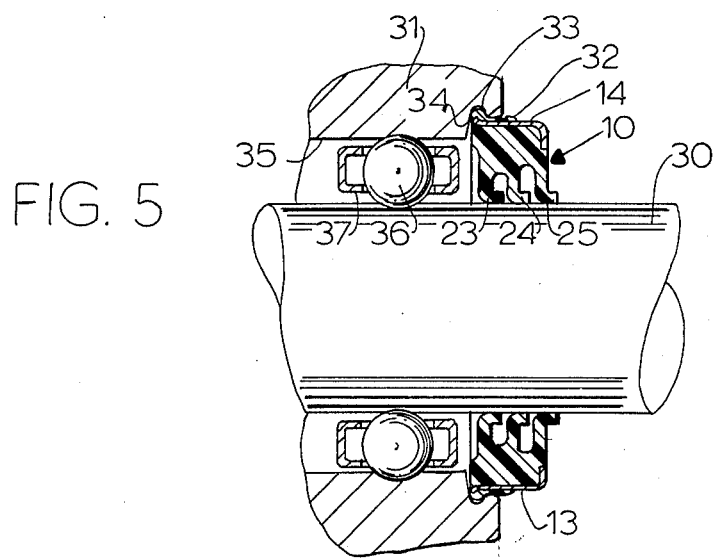

3,989,259

LIP SEAL WITH IMPROVED BORE RETENTION AND INSTALLATION INCLUDING THE SEAL

REFERENCE TO RELATED APPLICATION

This application is a continuation-in-part of application Ser. No. 506,057, filed Sept. 16, 1974 and now abandoned.

BACKGROUND OF THE INVENTION

This invention relates to an improved lip seal characterized by improved bore retention characteristics. It also relates to the combination betweeen the seal and the bore to improve seal retention.

In many machine installations, such as those where shafts are journaled in anti-friction bearings, it is important to prevent leakage of lubricant, and it is also very important to prevent the passage into the anti-friction bearings of foreign matter which may be abrasive or corrosive. In order to carry out these purposes, it is often advisable to provide a seal having plural lips rather than a seal having a single lip, because it is difficult to provide single-lip seals able adequately to exclude water, dust, dirt, and corrosive foreign matter,—a job that plural-lip seals do better. However, plural-lip seals are higher in torque, often much higher, in relation to the shaft than are single-lip seals and there is a tendency for such plural-lip seals to rotate with the shaft rather than to remain stationary in the bore. There is also an accompanying tendency for such seals to work their way out of the bore when the shaft is rotating.

The problem becomes particularly acute when relatively small sizes of bores, shafts, and seals are used, because then the amount of torque relative to the rotating of the shaft tends to be large in relation to the seal-retaining torque of the seal in the bore.

The problem also exists with lip seals having only one lip, especially where high torque values are encountered.

An object of the present invention is to solve the problem of retaining the seal in the bore and keeping it stationary, even though the seal is a triple-lip seal, or other plural-lip seal, as well as with a single-lip seal, and even though one is dealing with small-diameter shafts and bores.

The present invention thus is directed to solving the problem in certain environments of retaining the grease or oil lubricant while also preventing the ingress of water or other foreign matter and while retaining the seal properly in place.

SUMMARY OF THE INVENTION

The shaft seal of the present invention has a metal supporting member to which an elastomeric element is molded and bonded. The supporting member has a continuous cylindrical portion that is substantially smaller in outer diameter than the cylindrical portion of the bore in which the seal is to fit. At one end of this cylindrical portion is a radially inturned portion, while the other or free end of the cylindrical portion is provided, in the present invention, with a series of spaced-apart angularly outwardly deflected retaining portions that terminate at an outer diameter which is slightly greater than the diameter of the cylindrical portion of the bore. In this invention, the bore also has an annular groove that is substantially greater in diameter than the cylindrical portion of the bore, and this groove is also greater in diameter than these angularly outwardly deflected portions.

The elastomeric element of the shaft seal is bonded to the radially inner face of the cylindrical portion and to the axially inner face of the radially inturned portion and extends radially inwardly to provide a lip structure—either a single lip or a plurality of spaced-apart flexible radial lips, typically three wafer-like lips. These lips often terminate at an inner periphery substantially smaller than the periphery of the shaft, so that they provide considerable shaft interference. This large degree of shaft interference results in a substantial amount of relative torque between the lips and the shaft. The large interference is important for proper retention of the lubricant and for proper exclusion of foreign matter, but it gives rise to the problem discussed above, that such a seal, especially a plural-lip seal tends to rotate with the shaft and even to be worked out of the bore by rotation of the shaft.

However, in the present invention in addition to the outwardly deflected metal retention portions, the seal also has its elastomeric element provide a cylindrical bore-engaging portion which extends over about half of the outer surface of the cylindrical portion of the supporting member. This cylindrical elastomeric portion has an outer diameter somewhat greater than that of the cylindrical portion of the bore, and it also covers, though it but barely covers, the angularly outwardly deflected portions.

On installation, this bore-engaging elastomeric portion is caused to deform into the annular groove as well as to lock with the bore's cylindrical portion. When the seal is being installed, it is pushed axially in through the cylindrical portion of the bore toward the annular groove and against a wall at the end of a groove. The angularly deflected metal portions must be flexed radially inwardly during their movement through the cylindrical portion of the bore, since they normally are larger in outer diameter than is this portion of the bore; then they tend to spring out gradually (over a period of time) when they reach the annular groove, as the elastomer acquires a set. The elastomeric covering deforms as elastomers will, sufficiently to enable installation of the seal through a bore that is smaller in diameter than this covering, and when the seal is fully installed a substantial amount of the elastomer is in the annular groove, while the remainder of the excess amount (that in excess of the bore size) covers a portion of the cylindrical wall of the supporting member.

As a result of this structure, the elastomer covering not only seals against leakage along the bore but also provides a much greater torque than there is between the lip structure—even plural lips—and the shaft; thereby this structure prevents the seal from turning in the bore when the shaft rotates, and it also prevents the seal from working out of the bore. At the same time, the metal outward deflections help to prevent the seal from working out of the bore.

Other objects and advantages of the invention will appear from the following description of a preferred embodiment.

BRIEF DESCRIPTION OF THE DRAWINGS

In the drawings:

FIG. 1 is a view in end elevation on an enlarged scale of a plural-lip shaft seal embodying the principles of the invention.

FIG. 2 is a view similar to FIG. 1 of the metal supporting member for the seal before application of the elastomer.

FIG. 3 is a view in section taken along the line 3—3 in FIG. 2.

FIG. 4 is as further enlarged view in section taken through one of the outwardly deflected portions along the line 4—4 in FIG. 1.

FIG. 5 is a fragmentary view in elevation and in section on the scale of FIG. 1 showing a portion of an installation involving a bore, a shaft, a ball bearing, and the seal of FIGS. 1 and 4.

FIG. 7 is a similar view with the seal about halfway in.

DESCRIPTION OF SOME PREFERRED EMBODIMENTS

Figure 6:
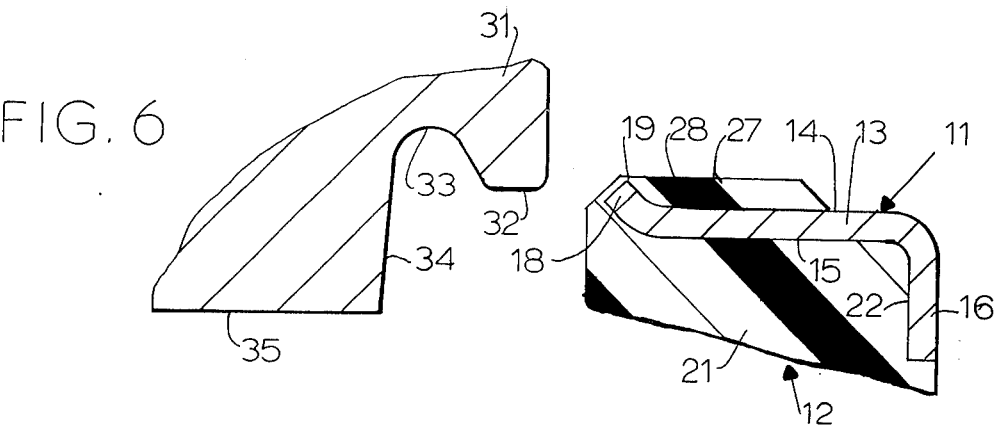
FIG. 6 is a greatly enlarged view of a portion of the installation of FIG. 5 showing the bore and the outer periphery of the seal at the time when the seal is beginning to be installed.

The plural-lip shaft seal 10 shown in the drawings is a good exemplification of the principles of the inventon. The seal 10 comprises two basic elements, a supporting member 11 of metal and an elastomeric element 12. The supporting member 11 has a cylindrical portion 13 having an outer periphery 14 which, as will be seen, is undersized with respect to the bore into which it is to be installed; there is a clearance between the periphery 14 and the bore when the seal 10 is installed. The cylindrical portion 13 also has an inner face 15. At one end of the cylindrical portion 13 the supporting member or case 11 has an inturned radial portion 16 which acts to stiffen the supporting member and to improve support of the elastomeric element 12.

At the free end 17 of the cylindrical portion 13, the seal 10 of the present invention is provided with a plurality of spaced-apart angularly outwardly deflected portions 18. These portions 18 may be made by forcing spaced-apart portions of the free end 17 outwardly in an operation somewhat like dinking except that the movement is radially outward instead of radially inward. These portions 18, which end in an outer edge 19, are shown in FIGS. 2 and 3 while FIGS. 2, 3 and 4 all indicate that the supporting member 11 is continuous (i.e., not cut, slit, torn or otherwise made discontinuous by the angularly outward deflections that form the portions 18) and that these portions 18 are spaced apart from each other by much larger unaffected cylindrical portions 20 terminating in the free end 17. The outward deflection is rather slight relative to the seal diameter, and it should be remembered that FIG. 4 is a substantial enlargement, but these deflections 18 are of vital importance in this invention.

The elastomeric member 12 has a body 21 which is bonded to the inner surface 15 and also to an inner surface 22 of the radially extending portion 16 of the supporting member 11. The body 21 is provided at its radially inner rim with a plurality of sealing lips, in this case three wafer-like lips, 23, 24 and 25. Each of these lips 23, 24, 25 may be substantially rectangular in cross section with a flat inner edge 26 (FIG. 4) but since the drawings are all enlargements, it will be appreciated that these lips 23, 24, 25 resemble thin wafers which are flexible. The three lips 23, 24 and 25 are flexed outwardly when they are installed on a shaft, as shown in FIG. 5. The flexing is enough to cause considerable torque relative to what would be caused by a single-lip seal, especially where the lip has a sharp edge, but this type of seal 10 is very effective in excluding foreign matter as well as in retaining grease and other lubricant.

The elastomeric element 12 extends around the free end 17 of the supporting member 11 and over about half of the cylindrical portion 13 overlying the extremities 19 of the angularly deflected members 18 and providing a cylindrical covering 27 having a cylindrical outer periphery 28, which is larger than the bore in which the seal 10 is to fit. This covering 27 extends only part of the way from the free end 17 toward the radially inturned portion 16, in order to provide an empty space into which the elastomer can flow. The angularly deflected members 18 are covered but just barely covered, and it is very important to note the cooperation between the two portions 18 and 27, as will be explained below.

FIG. 5 shows a typical installation in which the seal 10 is mounted on a shaft 30 with all three lips 23, 24 and 25 flexed. The machine part or housing 31 in which the installation is made is provided with a bore having a cylindrical portion 32 leading into an annular groove 33 and followed by a shoulder or radially inwardly extending portion 34 leading to another cylindrical portion 35. An anti-friction bearing is seated in the bore portion 35; it may be a ball bearing 36 seated between the shaft 30 and the bore 35 and provided with a suitable cage 37.

The effect of the present invention can best be explained with reference to FIGS. 6 through 9, great enlargements which illustrate both the installation of the seal into the bore and its retention there in its final position. Thus, FIG. 6 shows that the angularly outwardly deflected members 18 are larger in diameter than the cylindrical portion 32 of the bore and that the elastomeric cylindrical portion 27 is likewise larger than the bore portion 31. It also shows that the outer cylindrical wall 13 of the case 11 has an outer periphery 14 smaller than the bore portion 31, with clearances between them.

Figure 8:
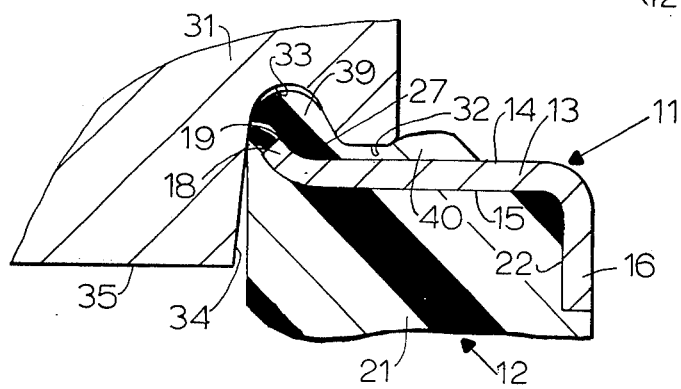
FIG. 8 is a similar view of the finished installation.

It should be borne in mind during the discussion of the installation and retention of the seal 10 that the seal 10 is an annular member and is not something that can simply be pushed up into the configuration shown in FIG. 8. It is necessary for the elastomer and metal portions that are larger in diameter than the bore portion 32 to move somewhere during the installation.

Figure 7:
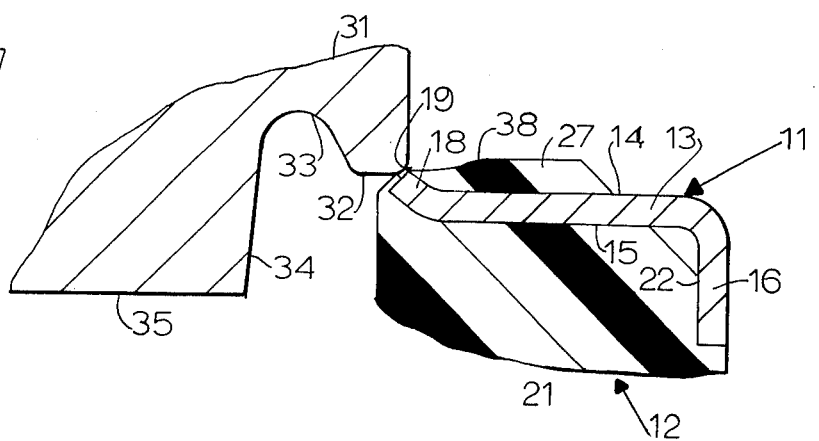

Thus, FIG. 7 shows an intermediate position during installation, and it will be seen that the angularly deflected members 18 have been flattened out to enable installation—that is, they have been given an inward flex. It will also be seen that elastomer has moved by flow from the portion 27 to a mound 38 bigger than the original diameter 28. This, of course, will result in a very tight fit; however, place must be found for the excess material.

FIG. 8 shows the seal completely installed. The outwardly deflected portions 18 have sprung out again and help to retain the seal 10 against retraction. Also, a considerable portion 39 of the elastomer from the cylindrical portion 27 is found in the groove 33 tending to fill that groove, while another portion 40 has flowed out along the cylindrical portion 13 and in between the periphery 14 and the bore 32, there being space there for the elastomer to flow into. FIG. 8 shows that the portion 39 lies in between the metal portion 18 and the cylindrical bore portion 32, where it resists removal of the seal 10 from the bore.

Figure 9:
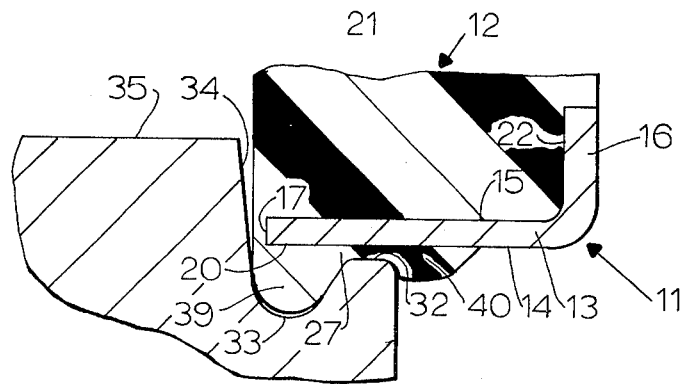
FIG. 9 is a view in section of a diametrically opposite portion of the seal from FIG. 8.

FIG. 9 shows a portion of the supporting member 11 where there is no angularly outwardly deflected member 18. Here the seal retention is slightly less effective, but this is important too because without the interruptions 20 between the successive angularly deflected portions 18 it would be impossible to install the seal, because it would be impossible to get the kind of flexing obtained in FIG. 7 and the springing action resulting from FIG. 8. Thus, the portions 20 in between the angularly deflected portions 18 are important too.

Thus, by cooperating between the various portions of the bore and the sizes, shapes, and materials of the seal 10, seal retention is provided. The seal 10, once installed, remains in place and remains stationary with the bore 32 during rotation of the shaft 30.

Figure 10:
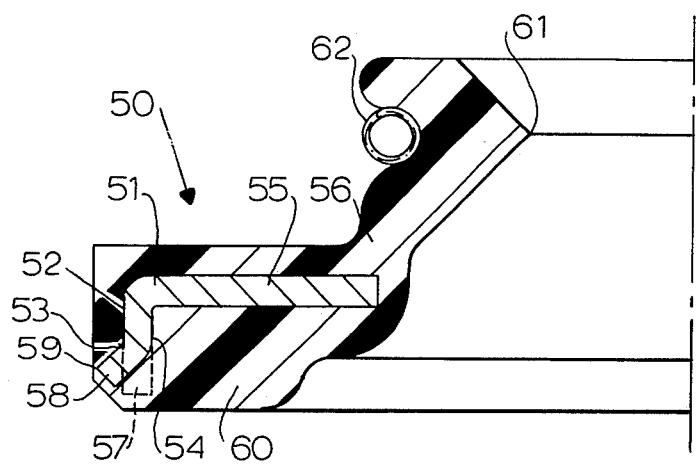
FIG. 10 is a view similar to FIG. 4 of a single-lip seal embodying the principles of the invention.

FIG. 10 shows a single-lip seal 50 embodying the principles of the invention. Its supporting member or case 51 has a cylindrical portion 52 having an outer periphery 53 which is undersized with respect to the bore into which it is to be installed. The cylindrical portion 52 also has an inner face 54. At one end of the cylindrical portion 52 the supporting member or case 51 has a series of inturned radial portions 55 which acts to stiffen the supporting member and to improve support of the elastomeric element 56.

At the free end 57 of the cylindrical portion 52, the seal 50 is provided with a plurality of spaced-apart angularly outwardly deflected portions 58. These portions 58 are identical in form to the portions 18 previously described and may be made in the same manner. These portions 58, which end in an outer edge 59 are all integral portions of the supporting member 51, which is continuous, these portions 58 being spaced apart from each other by much larger unaffected cylindrical portions terminating in the free end 17.

The elastomeric member 56 has a body 60 which is bonded to the inner surface 54 and also to both surfaces of the radially extending portion 55 of the supporting member 51. The body 60 is provided at its radially inner rim with a lip 61. A garter spring 62 is provided, as usual, to act on the lip 61, when the seal 60 is installed on a shaft, to urge it into firm control therewith. The urging may be enough to cause considerable torque relative to what would be caused by a seal without a spring.

In the structure of the bore-retaining part of the seal 60, in operation and in its operation there, there is no substantial difference from what has already been discussed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A machine installation comprising a housing member having a bore, a cylindrical shaft, and a lubricant-retaining shaft seal interposed between said bore and said shaft in sealing engagement with them both, the bore holding said shaft seal in non-rotating engagement while said shaft rotates, characterized by:

said bore having a cylindrical portion succeeded by an annular groove of generally semicircular cross section, said groove leading to a generally radially inwardly extending annular wall, said shaft seal having a metal supporting member and an elastomeric element, said supporting member having a continuous cylindrical portion substantially smaller in outer diameter than the cylindrical portion of said bore, and having at a free end a series of spaced-apart angularly outwardly deflected portions that terminate at an outer diameter slightly greater than the diameter of the cylindrical portion of said bore and smaller in diameter than said annular groove.

said elastomeric element being bonded to said supporting member and extending radially inwardly to provide a plurality of spaced-apart flexible lips that terminate at an inner diameter substantially smaller than the diameter of said shaft, to provide considerable shaft interference, said elastomeric element also providing a bore-engaging portion on the radially outer surface of said cylindrical portion of said supporting member to cover completely, but barely, said angularly outwardly deflected portions and to provide axially inwardly therefrom a cylindrical portion axially shorter than said supporting portion and of outer diameter greater than the diameter of said bore's cylindrical portion but smaller than the diameter of said annular groove.

whereby on installation said bore-engaging portion of said elastomeric element is caused to deform into said annular groove as well as to lock with said bore's cylindrical portion, said metal angularly deflected portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said shaft seal and said bore.

2. A machine installation comprising a housing member having a bore, a cylindrical shaft, and a lubricant-retaining shaft seal interposed between said bore and said shaft in sealing engagement with them both, the bore holding said shaft seal in non-rotating engagement while said shaft rotates, characterized by:

said bore having a cylindrical portion succeeded by an annular groove of generally semicircular cross section, said groove leading to a generally radially inwardly extending annular wall, said shaft seal having a metal supporting member and an elastomeric element molded and bonded to said supporting member, said supporting member having a continuous cylindrical portion substantially smaller in outer diameter than the cylindrical portion of said bore, and having at one end a radially inturned portion and at its other free end, a series of spaced-apart angularly outwardly deflected portions that terminate at an outer diameter slightly greater than the diameter of the cylindrical portion of said bore and smaller in diameter than said annular groove, said elastomeric element being bonded to the radially inner face of said cylindrical portion of said supporting member and to the axially inner face of said radially inturned portion and extending radially inwardly to provide a plurality of spaced-apart flexible radial wafer-like lips that terminate at an inner diameter substantially smaller than the diameter of said shaft, to provide considerable shaft interference tending toward a substantial amount of relative torque between said lips and said shaft, in order to give improved lubricant retention and improved foreign matter exclusion, said elastomeric element also providing a bore-engaging portion on the radially outer surface of said cylindrical portion of said supporting member to cover completely, but barely, said angularly outwardly deflected portions and to provide axially inwardly therefrom a cylindrical portion axially shorter than said supporting portion and of outer diameter greater than the diameter of said bore's cylindrical portion but smaller than the diameter of said annular groove, whereby on installation said bore-engaging portion of said elastomeric element is caused to deform into said annular groove as well as to lock with said bore's cylindrical portion, said metal angularly deflected portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said shaft seal and said bore.

3. A shaft seal of the radial type, including in combination:

a metal supporting member and an elastomeric element molded and bonded to said supporting member, said supporting member having a continuous cylindrical portion having at one end a radially inturned portion and at its other end, a series of spaced-aprt angularly outwardly deflected portions, said elastomeric element being bonded to the radially inner face of said cylindrical portion of said supporting member and to the axially inner face of said radially inturned portion and extending radially inwardly to provide a plurality of spaced-apart flexible radial wafer-like lips, said elastomeric element also providing a bore-engaging portion on the radially outer surface of said cylindrical portion of said supporting member to cover completely, but barely, said angularly outwardly deflected portions and to provide axially inwardly therefrom a cylindrical portion axially shorter than said supporting portion, whereby on installation said bore-engaging portion of said elastomeric portion is caused to deform into said annular groove as well as to lock with said bore's cylindrical portion, said metal angularly extending portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said sealing member and said bore.

4. A machine installation comprising a housing member having a bore, a cylindrical shaft, and a lubricant-retaining shaft seal interposed between said bore and said shaft in sealing engagement with them both, the bore holding said shaft seal in non-rotating engagement during relative rotation of said shaft and said seal, characterized by:

said bore having a cylindrical portion succeeded by an annular groove leading to a generally radially inwardly extending annular wall, said shaft seal haviing a metal supporting member and an elastomeric element, said supporting member having a continuous cylindrical portion substantially smaller in outer diameter than the cylindrical portion of said bore, and having at a free end a series of spaced-apart angularly outwardly deflected portions that terminate at an outer diameter slightly greater than the diameter of the cylindrical portion of said bore and smaller in diameter than said annular groove, said elastomeric element being bonded to said supporting member and extending radially inwardly to provide flexible lip means that terminates at an inner diameter substantially smaller than the diameter of said shaft, to provide substantial shaft interference, said elastomeric element also providing a bore-engaging portion on the radially outer surface of said cylindrical portion of said supporting member to provide axially inwardly therefrom a cylindrical portion axially shorter than said supporting portion and of outer diameter greater than the diameter of said bore's cylindrical portion but smaller than the diameter of said annular groove, whereby on installation said bore-engaging portion of said elastomeric element is caused to deform into said annular groove as well as to lock with said bore's cylindrical portion, said metal angularly deflected portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said shaft seal and said bore.

5. The machine installation of claim 4 wherein said flexible lip means comprises a plurality of lips.

6. The machine installation of claim 4 wherein said flexible lip means comprises a single lip.

7. A shaft seal of the radial type, including in combination:

a metal supporting member and an elastomeric element molded and bonded to said supporting member, said supporting member having a continuous cylindrical portion having at one end a radially inturned portion and at its other end, a series of spaced-apart angularly outwardly deflected portions, said elastomeric element being bonded to the radially inner face of said cylindrical portion of said supporting member and to the axially inner face of said radially inturned portion and extending radially inwardly to provide flexible radial lip means, said elastomeric element also providing a bore-engaging portion on the radially outer surface of said cylindrical portion of said supporting member, to cover said angularly outwardly deflected portions and to provide axially inwardly therefrom a cylindrical portion axially shorter than said supporting portion, whereby on installation said bore-engaging porion of said elastomeric element is caused to deform into said annular groove as well as to lock with said bore's cylindrical portion, said metal angularly extending portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said sealing member and said bore.

8. The shaft seal of claim 7 wherein said angularly outwardly deflected portions are continuous on all sides thereof with said metal supporting member.

9. A shaft seal of the radial type, including in combination:
   a metal supporting member and an elastomeric element molded and bonded to said supporting member,
   said supporting member having a continuous cylindrical portion having at one end a radially inturned portion and at its other end, a series of spaced-apart angularly outwardly deflected portions,
   said elastomeric element being bonded to the radially inner face of said cylindrical portion of said supporting member and to the axially inner face of said radially inturned portion and extending radially inwardly to provide a lip body having a lip and having spring means for urging said lip shaftward,
   said elastomeric element also providing a bore-engaging portion on the radially outer surface of said cylindrical portion of said supporting member to cover completely, but barely, said angular outwardly deflected portions and to provide axially inwardly therefrom a cylindrical portion axially shorter than said supporting portion,
   whereby on installation said bore-engaging portion of said elastomeric element is caused to deform into said annular groove as well as to lock with said bore's cylindrical portion, said metal angularly extending portions being flexed radially inwardly on movement axially toward said groove and then springing back outwardly to help lock in said groove and prevent movement of said seal out from a final position bearing against said generally radially extending wall of said bore, said elastomeric bore-engaging portion also helping to prevent relative rotation between said sealing member and said bore.

10. The machine installation according to claim 1, wherein said continuous cylindrical portion of said supporting member is a continuous web with a free end that is circular except at integrally formed said angularly outwardly deflected portions which are continuous circumferentially with the remainder of said free end.

11. The machine installation according to claim 1 wherein a substantial portion of the elastomeric bore-engaging portion lies in said annular groove on the same side of said angularly-outwardly deflected portions as said bore's cylindrical portion and acts to urge said deflected portions toward the opposite side of said groove.

* * * * *